United States Patent [19]
Klages et al.

[11] Patent Number: 5,226,696
[45] Date of Patent: Jul. 13, 1993

[54] MOTOR VEHICLE CHASSIS

[75] Inventors: Ulrich Klages, Ingolstadt; Norbert Enning, Kipfenberg; Heinrich Timm, Ingolstadt, all of Fed. Rep. of Germany

[73] Assignee: Audi A.G., Fed. Rep. of Germany

[21] Appl. No.: 761,786

[22] PCT Filed: Mar. 19, 1990

[86] PCT No.: PCT/EP90/00450
§ 371 Date: Sep. 20, 1991
§ 102(e) Date: Sep. 20, 1991

[87] PCT Pub. No.: WO90/11369
PCT Pub. Date: Oct. 4, 1990

[30] Foreign Application Priority Data
Jun. 5, 1989 [DE] Fed. Rep. of Germany ....... 3918283

[51] Int. Cl.$^5$ .............................................. B60R 27/00
[52] U.S. Cl. ....................................... 296/203; 296/29; 403/205; 403/403; 52/280
[58] Field of Search ............... 296/203, 194, 29, 30, 296/205; 403/205, 403; 29/897.2; 52/280

[56] References Cited

U.S. PATENT DOCUMENTS

| | | | |
|---|---|---|---|
| 98,608 | 1/1870 | Marvin | 52/280 |
| 343,067 | 6/1886 | Roeking | 296/29 |
| 3,591,231 | 7/1971 | Wessells et al. | 296/28 R |
| 4,305,677 | 12/1981 | Kowalski | 403/205 X |
| 4,335,973 | 6/1982 | Beck et al. | 403/205 X |
| 4,618,163 | 10/1986 | Hassler et al. | 280/785 |
| 4,641,987 | 2/1987 | Schlegel | 403/205 X |
| 4,685,839 | 8/1987 | Plater et al. | 403/403 X |
| 4,775,181 | 10/1988 | Shoda | 296/203 |
| 5,018,781 | 5/1991 | Kumasaka et al. | 296/203 X |

FOREIGN PATENT DOCUMENTS

| | | | |
|---|---|---|---|
| 331865 | 9/1989 | European Pat. Off. | 298/29 |
| 945073 | 6/1956 | Fed. Rep. of Germany | 403/205 |
| 2049567 | 12/1980 | United Kingdom | |

OTHER PUBLICATIONS

Ashley, Steve, "The Shape of Cars to Come", *Mechanical Engineering* May 1991, pp. 37-38.

Primary Examiner—Russell D. Stormer
Assistant Examiner—Gary C. Hoge
Attorney, Agent, or Firm—Jacques M. Dulin; Thomas C. Feix

[57] ABSTRACT

A vehicle chassis constructed of metal frame elements which are joined together by connecting node elements (connectors). The node elements are configured as upwardly open molded pieces (shells) When assembled, a bottom surface portion of each node element is received in conforming notches disposed adjacent the outwardly facing end surfaces of the joining ends of abutting frame elements in such a manner that no part of the node element forms the inward facing regions of the vehicle frame defining the windscreens and door openings. Each node element is provided with side projections (tangs) which extend beyond the notch portions of the adjoining frame elements to increase surface contact area between the node element and each frame element. A cover plate or the vehicle body skin is provided to cover the upward facing end of the node element.

15 Claims, 2 Drawing Sheets

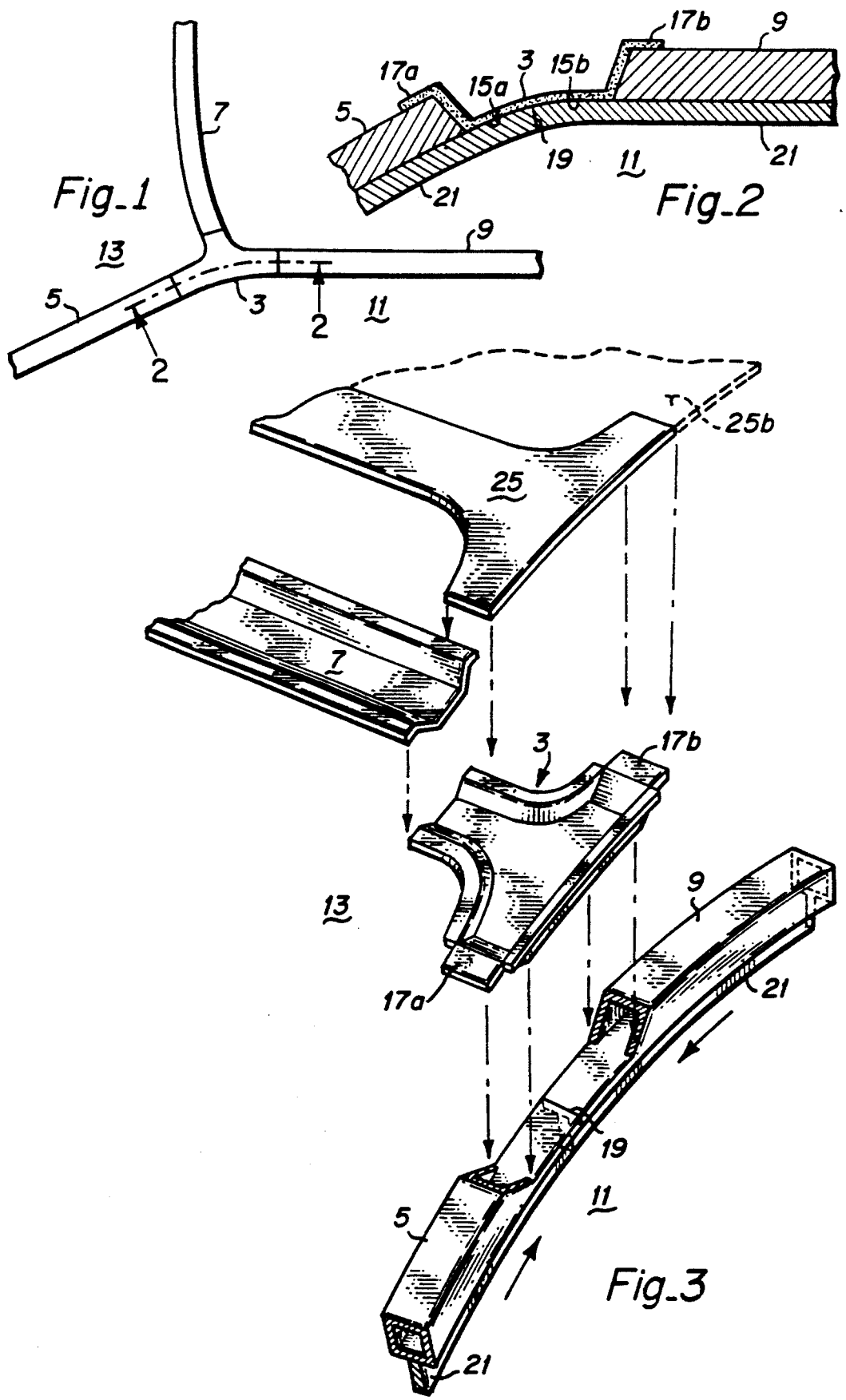

MOTOR VEHICLE CHASSIS

FIELD

The invention relates generally to a method and apparatus for assembly of a motor vehicle chassis More particularly, the invention relates to a method and apparatus for assembling a motor vehicle chassis in which connectors or nodes are used to join together cast metal frame elements. The connector nodes join together the frame elements by fitting within specially provided notched end portions of each frame element in such a manner as to provide a smooth continuous seating surface for the windows and doors. The joining technique also reduces by half the number of structural joints which form part of the frame opening seating surfaces of the windows and doors.

BACKGROUND

Automotive chassis which use nodes or connecting members to hold together extruded light metal or cast metal frame sections are well known in the art. Examples of automotive chassis using nodes to connect tubular frame sections or elements are shown in Hasler et al (U.S. Pat. No. 4,618,163) and UK Patent No. (GB 2 049 567).

In Hasler et al the frame elements comprise cast metal or extruded light metal rods. The ends of the frame elements are aligned and fitted within a conforming receiving ends of connecting members or nodes. The openings for the doors and windscreens are formed by the nodal connection of several cast metal frame elements and by the segments of the node elements which also face the openings. This results in the formation a joint for every union between a node element and a frame element Thus, transitional regions between adjoining frame elements contain at least two joints because of the node element. Since a portion of each node element also forms a part of the boundary of each opening, it is difficult to produce an exact contour curve for the openings To ensure an exact contour curve, a precise fit of the node to each receiving end of an abutting frame element is required, as well as a stable fixation of the node to each connected frame element during the assembly process. This method results in a labor intensive and costly assembly technique.

In the UK Patent, the frame elements are round tubular girders which are held together by a tubular node elements or lugs. The connectors have tubular flanges for sleeve-like connection to corresponding girder ends. As in Hasler et al, a circumferential joint is formed by the union of each girder to a connector so that there exists at least two joints for every transitional region between adjoining girders. As above, this technique results in an undesirable number of joints along the boundary curves of the frame which define the seating surfaces for the windscreen and door openings thus rendering the final assembly of a chassis having smooth contour curves difficult.

Accordingly, there is a definite need in the art for an improved node-connected motor vehicle chassis wherein the node elements do not form part of the seating surfaces for the windscreens and doors so that the number of joints in these boundary areas of the chassis is reduced by half, and a smooth contour curve for each transitional region is achieved. There is also need for a method of construction of such a motor vehicle chassis which is simple and cost effective to implement.

THE INVENTION

OBJECTS

It is a primary object of the present invention to provide an improved motor vehicle chassis of the type constructed of tubular extruded or cast metal tubular members connected by node elements wherein the number of joints between abutting frame elements facing the seating surfaces for the door and window openings is reduced by half;

It is another object of the invention to provide such an improved motor vehicle chassis wherein the node elements join abutting frame elements by bonding to corresponding notched ends of each adjoining frame element in a manner such that the nodes themselves do not form part of the seating surface for the window and door openings;

It is another object of the invention to provide an improved node-connected motor vehicle chassis wherein the nodes include side projections for increasing the surface area of contact for bonding to each frame element;

It is yet another object of the invention to provide an assembly technique for an improved motor vehicle chassis of the type using a plurality of connecting tubular frame elements and nodes whereby the structural parts may be fastened together in a cost efficient and simple manner; and Still other objects will be evident from the specification drawings and claims which follow.

DRAWINGS

The invention is described in more detail with reference to the drawings in which;

FIG. 1 is a fragmentary schematic top plan view of a node element of a car body showing the node connection for the juncture of a front roof column to a front roof frame and a side roof frame;

FIG. 2 is a side elevation view in partial cross section taken along the line and in the direction of arrows 2—2 of FIG. 1;

FIG. 3 is a partially exploded isometric view of FIG. 1; and

SUMMARY

Figure 4:
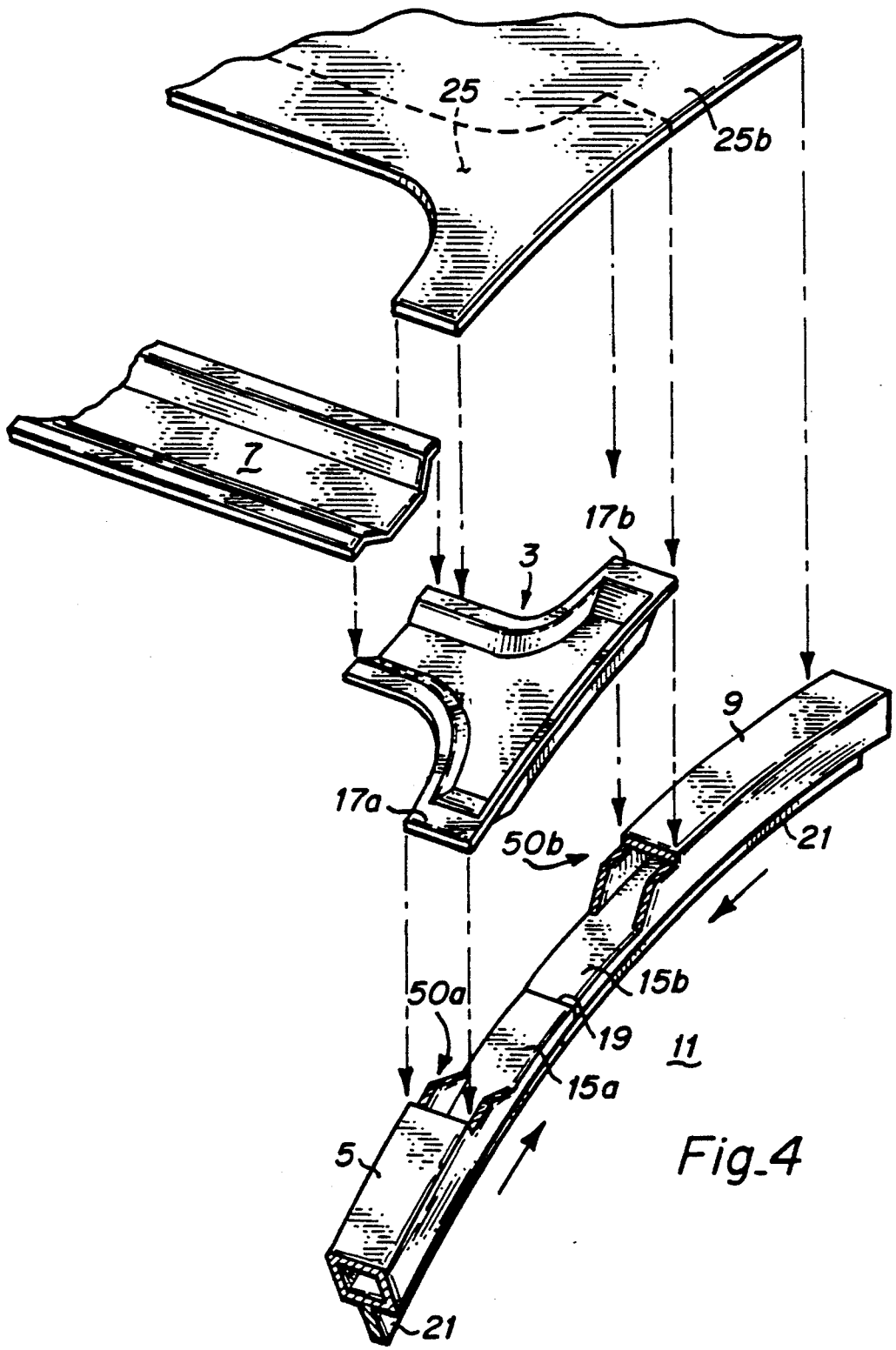
FIG. 4 is a partially exploded isometric view showing an alternate embodiment of a stepped notch fitting for the node element.

A method and apparatus for the construction of a motor vehicle chassis of the type having openings for front and rear windscreens and doors. The vehicle chassis is constructed of cast metal or extruded aluminum frame elements which are joined together by connecting node elements The node elements are preferably configured as upwardly open molded pieces and are easily manufactured by known molding techniques.

The node elements connect to the frame elements in a manner such that they do not form part of the frame boundary defining the seating surface for the windows and doors. This is accomplished by providing outwardly disposed notches or recesses on the adjoining ends of each frame element. When the adjoining frame elements are butted against each other, the notches combine to form a relieved portion dimensioned to conformingly receive the placement of the node there-within. The node may then be fastened in place by any number of known fastening techniques and is preferably fastened by a bonding adhesive. Smooth transitional curves are easily achieved since only a single joint is formed between adjoining frame elements in the boundary areas defining the sealing surface for the windscreens and doors. Also, this technique substantially reduces the problems associated with prior art designs of axial alignment and fixation of adjoining frame elements within the lug-type connectors since the frame elements of the present invention are easily aligned by direct abutment to one another along a common joint.

Additional side projections or flaps may be provided to the ends of the node elements to increase the contact surface area for connection to the frame elements This is a special advantage when the structural parts are to be glued together.

A plate may be provided to cover the upwardly open facing surface of each open molded node element The cover plate provides a box-type construction to the open molded node element which improves the overall strength of the vehicle chassis The cover also provides a smooth base for lacquering the completed chassis. In an alternative embodiment, the node cover plate may be formed as part of the outer skin of the vehicle body.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows one juncture of an automobile chassis comprising a node element 3 which is used to connect together three frame members 5, 7 and 9. In this example, frame member 5 is a roof support post (the inclined front left post), frame member 7 is a lateral roof support brace (transverse post), and frame member 9 is a longitudinal roof support brace 9 (front to rear longitudinal post). The roof support post 5 and the longitudinal roof support brace 9, along with other structural frame members (not shown in the Figure), combine to form a boundary for opening 11 which is used to accommodate a door (front door not shown). Similarly, the roof support post 5 and lateral roof support brace 7 along with other frame pieces (not shown) form a boundary for opening 13 which accommodates the front windscreen (not shown). While the following description specifically describes the novel node connection for the frame elements comprising the front windscreen and door openings, it is understood that the assemblies for the node connectors for the frame elements which comprise the rear window and rear side window openings are also possible without any significant deviation from the teachings herein described.

FIGS. 2 and 3 illustrate in greater detail how the novel node connection between adjacent frame members of the present invention results in a reduced number of joints in the frame boundary region which define the seating surfaces for the doors and front windscreen. In FIG. 2, longitudinal roof support brace 9 abuts inclined vertical roof support post 5 along a single joint 19. Each frame member 5, 9 is provided with a notch 15a, 15b for receiving the specially configured node element 3. Node element 3 is preferably a plastic molded piece and is connected to the notches 15a, 15b of frame members 5 and 9 by known adhesive bonding techniques. The node element may also be formed by known superplastic shaping processes or may even be constructed out of metal and may be formed by a metal casting process. Accordingly, other methods for fastening may be used including but not limited to screws, spot welding, rivets, and rivets used in combination with adhesives, a technique known in the art as rivet bonding.

The node element 3 is also provided with side projections or flap portions 17a, 17b which are disposed to overlap an upper surface of each abutting frame member 5, 9. The flap portions 17a, 17b provide for a larger contact surface area for connection with each abutting frame members. A large contact area is desirable when the component parts are to be glued or adhesive bonded to each other.

As is seen in FIGS. 2 and 3, the node element 3 only extends along an upper outward facing surface of each frame member 5 and 9. This results in the single joint abutment of the two frame members 5 and 9 at the bottom inward facing surface of each frame member. Also note that only the cast metal frame elements 5, 7, and 9 directly bound the windscreen and door openings 13 and 11, respectively. This is a significant improvement over the prior art methods since the number of joints between the frame elements is reduced by half since the node element 3 no longer forms part of the inward facing boundary area for the openings 11 or 13 Thus, a continuous and exactly fitting curved metal surface for a door or window is achieved in a simple way. The continuous curve of the contour also permits the formation of an exact seating surface for a seal such as a conventional rubber sealing member for a window (not shown).

As is shown in FIG. 3, each frame member 5, 9 is also provided with an inwardly extending flange member which combine to form a continuous sealing flange 21 when the frame elements 5 and 9 are joined together at joint 19. In this example, continuous sealing flange 21 corresponds to the door seating surface. A rubber sealing member (not shown) may be fitted over or to the continuous sealing flange 21 in accordance with known methods for final assembly of motor vehicles.

Construction of the node element 3 as an open molded piece (shell) provides a simple method for securing adjoining frame members together. As noted above, the prior art tubular chassis designs are constructed by fitting the joining ends of frame elements within lug-type connectors. In these designs, special care is required to ensure proper angular and spatial alignment, and stable fixation of the frame elements during the assembly process especially when the final linking frame element is fitted within the connectors to complete the frame. These problems are now overcome since the single joint abutment of adjoining frame elements permits a simple way to ensure proper axial alignment of the frame elements Moreover, the sealing flange 21 and flats of the notches 15a, 15b assist in the alignment process.

In order to reduce the number of outwardly visible joints, it is desirable to cover the open end of the node elements 3. A covering also creates a box construction which improves the strength of the node element. For this purpose, a plate 25 may be provided to cover the upward open facing surfaces of the node element 3 and any open surfaces of the frame elements As is seen in FIG. 3, the plate 25 is configured to cover both the node element 3 and the lateral roof support brace 7 and has a top surface configuration which smoothly conforms to outer surface configuration of the adjoining frame members 5 and 7. In an alternate embodiment, the plate element 25b (shown in phantom) may be formed as part of the outer skin which comprises the vehicle body, in this example the roof skin. Covering the outwardly open node elements 3 by a plate or a continuously formed outer skin also provides a uniformly smooth base for application of a smooth lacquer finish to a fully assembled vehicle chassis.

FIG. 4 shows an alternate embodiment for the fitting arrangement of the node element within the notches 15a, 15b of frame elements 5 and 9. In this arrangement, each notch 15a, 15b is further provided with a stepped or relieved area 50a, 50b having a depth dimension sufficient to accommodate tangs 17a, 17b of node element 3. As is evident from the FIGURE, a continuously smooth outer surface contour for the frame members 5 and 9 is now formed without any visible ridges or bumps (as in FIG. 3). This permits the placement of a cover plate 25 (phantom) or outer vehicle body skin covering 25b to lie flat over the node element and to be bonded to the node tangs 17a, b and/or ribs 5 and 9.

It should be understood that various modifications within the scope of this invention can be made by one of ordinary skill in the art without departing from the spirit thereof We therefore wish our invention to be defined by the scope of the appended claims in view of the specification as broadly as the prior art will permit

We claim:

1. An improved motor vehicle chassis comprising in operative combination:
   a) a plurality of frame elements, said frame elements having end portions joined abutted together to form contour profiles which define frame boundary areas for window and door openings of a motor vehicle chassis;
   b) each of said end portions of said frame elements includes a notch disposed along an outer surface thereof, said notches of abutting end portions of said frame elements forming a single relieved portion disposed facing away from said openings; and
   c) at least one node element joining said plurality of frame elements, said node element having a bottom surface contour which conformingly overlies said relieved portion; and 2. An improved motor vehicle chassis as in claim 1 wherein:
   a) said frame elements comprise cast metal sections; and
   b) said node element is formed as a generally bowl shaped open molded piece having a concave upward surface disposed to face away from said openings when fastened to said relieved portion.

3. An improved motor vehicle chassis as in claim 2 which includes:
   a) at least one covering said node element; and
   b) said plate having an exposed outer surface which conforms to the surface contour of adjacent abutting frame elements.

4. An improved motor vehicle chassis as in claim 2 wherein said concave upward surface of said node element is covered by a plate member which forms part of the outer skin of said motor vehicle body.

5. An improved motor vehicle chassis as in claim 2 wherein:
   a) said notches are stepped; and
   b) said node element includes laterally extending tangs dimensioned to conformingly fit within the stepped portions of said notches to produce a smooth outer contour surface curve.

6. An improved motor vehicle chassis as in claim 5 which includes:
   a) at least one plate which fit over and covering said node element; and
   b) said plate has an exposed outer surface conforming to the surface contour of adjacent abutting frame elements.

7. An improved motor vehicle chassis as in claim 5 wherein said concave upward surface of said node element is covered by part of the outer skin of said motor vehicle body.

8. An improved motor vehicle chassis as in claim 1 wherein;
   a) said frame elements comprise extruded aluminum sections; and
   b) said node element is formed as a generally bowl shaped open molded piece having a concave upward surface disposed to face away from said openings when fastened to said relieved portion.

9. An improved motor vehicle chassis as in claim 8 which includes:
   a) at least one covering said node element; and
   b) said plate having an exposed outer surface which conforms to the surface contour of adjacent abutting frame elements.

10. An improved motor vehicle chassis as in claim 8 wherein said concave upward surface of said node element is covered by a plate member which forms part of the outer skin of said motor vehicle body.

11. An improved motor vehicle chassis as in claim 8 wherein:
    a) said notches are stepped; and
    b) said node element includes laterally extending tangs dimensioned to conformingly fit within the stepped portions of said notches to produce a smooth outer contour surface curve.

12. An improved motor vehicle chassis as claim 11 which includes:
    a) at least one plate covering said node element; and
    b) said plate has an exposed outer surface conforming to the surface contour of adjacent abutting frame elements.

13. An improved motor vehicle chassis as in claim 11 wherein said concave upward surface of said node element is covered by part of the outer skin of said motor vehicle body.

14. An improved method for the assembly of a motor vehicle chassis of the type constructed from a plurality of frame elements joined together by node elements comprising the steps of:
    a) providing a notch on an outwardly facing end portion of each frame element used to form part of a frame boundary area for window or door openings;
    b) positioning the notched ends of corresponding frame elements together so that abutting notches form a single relieved portion disposed along an outward surface of said frame boundary area facing away from said openings; and
    c) securing a bottom surface of an open molded node element to conformingly overlie said outward facing relieved portion.

15. An improved method for the assembly of a motor vehicle chassis as in claim 14 including the step of:
    a) covering said open molded node element with a plate member; and
    b) fastening said plate member to at least portions of said node element.

* * * * *